US007687114B2

(12) United States Patent
Franchet et al.

(10) Patent No.: US 7,687,114 B2
(45) Date of Patent: Mar. 30, 2010

(54) METHOD FOR METALLIC COATING OF FIBRES BY LIQUID TECHNIQUE

(75) Inventors: Jean-Michel Patrick Maurice Franchet, Paris (FR); Jean-Francois Fromentin, Cesson la Foret (FR); Jean-Michel Quenisset, Pessac (FR); Carine Duda, Toulouse (FR); Corinne Arvieu, Pessac (FR); Pierre Eric Frayssines, Fontaine (FR)

(73) Assignees: SNECMA, Paris (FR); CNRS, Paris (FR)

( * ) Notice: Subject to any disclaimer, the term of this patent is extended or adjusted under 35 U.S.C. 154(b) by 518 days.

(21) Appl. No.: 11/539,044

(22) Filed: Oct. 5, 2006

(65) Prior Publication Data

US 2007/0110913 A1    May 17, 2007

(30) Foreign Application Priority Data

Oct. 5, 2005    (FR) ................... 05 53008

(51) Int. Cl.
B05D 1/36  (2006.01)
B05D 1/18  (2006.01)
C23C 16/00  (2006.01)

(52) U.S. Cl. ............... 427/404; 427/249.1; 427/402; 427/419.7; 427/431; 427/434.6; 427/434.7

(58) Field of Classification Search .......... 427/430.1, 427/434.2, 434.6, 434.7
See application file for complete search history.

(56) References Cited

U.S. PATENT DOCUMENTS

| | | | | |
|---|---|---|---|---|
| 3,811,920 A | * | 5/1974 | Galasso et al. ........... 428/366 |
| 4,405,685 A | * | 9/1983 | Honjo et al. ........... 428/368 |
| 4,659,593 A | * | 4/1987 | Rocher et al. ........... 427/310 |
| 5,172,746 A | * | 12/1992 | Corwin ........... 164/97 |
| 5,244,748 A | | 9/1993 | Weeks, Jr. et al. | |

(Continued)

FOREIGN PATENT DOCUMENTS

EP    0 423 996 A1    4/1991

(Continued)

OTHER PUBLICATIONS

Choy et al. Effects of Surface Modification on the Interfaicial Checmical Stability and Strength of Continuous SiC Fibres after Exposure to Molten Aluminum. Scripta Metallurgica et Materialia, vol. 32, No. 2 pp. 219-224, 1995.*

(Continued)

*Primary Examiner*—David Turocy
(74) *Attorney, Agent, or Firm*—Oblon, Spivak, McClelland, Maier & Neustadt, L.L.P.

(57) ABSTRACT

The invention relates to a method for metallic coating of fibers by liquid technique, in which a fiber, coated with a material forming a diffusion barrier with the metal, is drawn through a liquid metal bath to be coated therewith. The method is characterized in that prior to the passage of the fiber into the bath, the fiber is coated with a compound wettable by the metal. The coating of the fiber by the metal is facilitated by the presence of the compound, forming an interface wettable by the metal.

11 Claims, 1 Drawing Sheet

Figure 1:
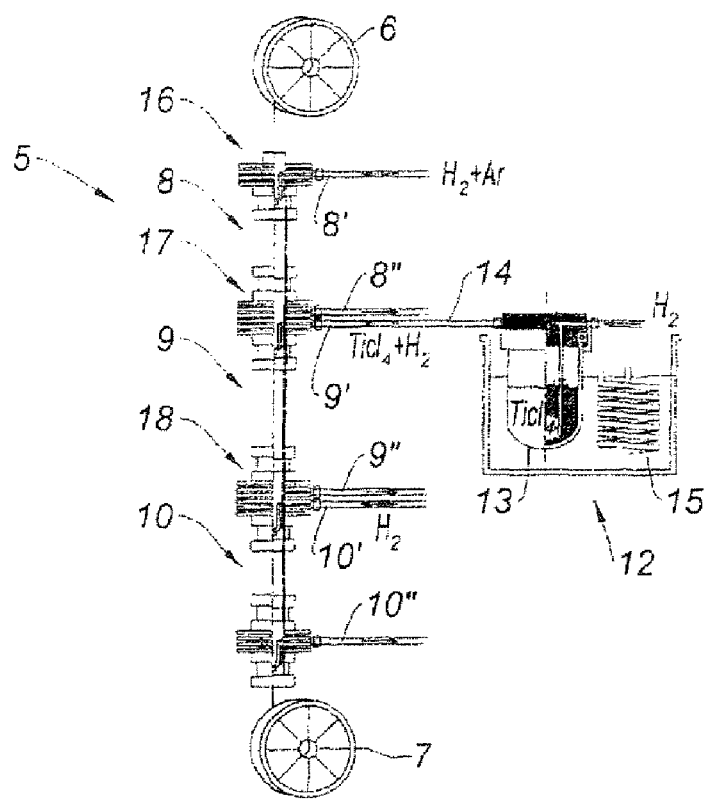

U.S. PATENT DOCUMENTS 6,174,570 B1 * 1/2001 Dambrine et al. ........ 427/434.7

FOREIGN PATENT DOCUMENTS

EP 423996 A1 * 4/1991

OTHER PUBLICATIONS

U.S. Appl. No. 12/124,562, filed May 21, 2008, Franchet, et al.

C. Duda, et al., "Microstructural Characterization of Liquid Route Processed Ti 6242 Coating of SCS-6 Filaments", Composites Part A: Applied Science and Manufacturing, XP004499220, vol. 35, No. 5, May 2004, pp. 511-517.

* cited by examiner

METHOD FOR METALLIC COATING OF FIBRES BY LIQUID TECHNIQUE

The invention relates to a method for metallic coating of fibres by liquid technique.

In particular the aeronautic field, a constant objective is to optimize the strength of the parts for minimum mass and size. Thus, certain parts may now include an insert made of a metal matrix composite. Such a composite comprises a metal alloy matrix, for example of titanium (Ti) alloy, in which fibres extend, for example silicon carbide (SiC) ceramic fibres. Such fibres have a much higher tensile strength than that of titanium (typically 4000 MPa compared with 1000 MPa) and typically three times greater stiffness. Hence it is the fibres that absorb the loads, the metal alloy matrix ensuring load transfer between the fibres, providing a binding function with the rest of the part, and a function of protecting and separating the fibres, which must not come into contact with one another. Furthermore, ceramic fibres are strong, but brittle, and must necessarily be protected by metal.

These composites can be used in the manufacture of discs, shafts, cylinder bodies, casings, spacers, as reinforcements of monolithic parts such as blades, etc. They may also find applications in other fields, in which a volumetric force field is applied to a part, for example, a pressure chamber such as a gun or a pressurized fluid tank.

To obtain such a composite insert, wires called "coated wires", comprising a metal-coated ceramic fibre, are formed beforehand. The metal coating gives the wire greater stiffness but also better toughness, which is useful for handling. Preferably, a very fine carbon or tungsten wire is the core of the fibre, running along its axis, this carbon wire being coated with silicon carbide, while a thin layer of carbon or pyrocarbon coats the silicon carbide and is therefore inserted between the fibre and the metal, to provide the function of a diffusion barrier, for protecting the fibre against notch and buffer effects during the differential thermal relaxation that occurs upon cooling the liquid metal deposited on the fibre.

Composite wires, or coated wires, can be produced in various ways, for example by metal vapour deposition on the fibre under an electric field, by electrophoresis using metal powder, or by coating the fibres by dipping them, in a liquid metal bath. Such a fibre coating method, by dipping in a liquid metal, is described in Patent EP 0 931 846, in the name of the Applicant. The production of wires by this method is rapid. Composite wires or coated wires are thereby obtained, serving as a basis for producing the composite insert to be included in the part.

In the method of Patent EP 0 931 846, the liquid metal is maintained in levitation in an appropriate crucible, without contact with the walls thereof, at an appropriate temperature; the ceramic fibre, kept taunt by gripping means, is drawn through the metal bath. This method is implemented at high speed, making it possible, on the one hand, to reduce the time of passage of the ceramic fibre in the bath and therefore to limit its interaction with the liquid metal, thereby reducing its deterioration, and, on the other, to rapidly obtain large quantities of coated wire on an industrial scale.

Typically, the ceramic fibre is a silicon carbide fibre about 100 to 150 µm in diameter, formed by chemical vapour deposition of silicon carbide on a carbon or tungsten core about 15 to 40 µm in diameter and protected by an outer carbon or pyrocarbon coating about 3 µm thick. This outer coating has the function of protecting the silicone carbide fibre against chemical attack and against the propagation of microdefects; hence this coating serves as a diffusion barrier between the ceramic fibre and the metal alloy, which is chemically highly reactive, and also provides protection against the propagation of defects.

The problem that arises is how to achieve wetting of the carbon coating by the metal alloy, that is, the ability of the alloy to spread suitably on the coating surface in order to bond therewith. The wettability decreases with the run speed of the fibre through the metal bath, and yet the highest possible speed is desirable. In the example considered, namely a silicon carbide fibre coated with carbon and then coated with a titanium alloy, the coating of the fibre by the metal alloy is only possible thanks to the formation of titanium carbide TiC at the interface between the fibre and the liquid metal. This formation is not always feasible at high run speeds.

It is the object of the invention to overcome this problem.

For this purpose, the invention relates to a method for metallic coating of fibres by liquid technique, in which a fibre, coated with a material forming a diffusion barrier with the metal, is drawn through a liquid metal bath to be coated therewith, characterized in that, prior to the passage of the fibre into the bath, the fibre is coated with a compound wettable by the metal.

Thanks to the inventive method, the coating of the fibre by the metal is facilitated by the presence of the compound forming an interface wettable by the metal.

Preferably, since the coating of the fibre by the metal involves the formation of an intermediate compound between the barrier-forming material and the metal, the fibre is pre-coated with the intermediate compound.

Also preferably, the fibre is a ceramic fibre.

Advantageously in this case, the fibre is a silicon carbide fibre, coated with a layer of barrier-forming pyrocarbon or carbon, and the metal is a titanium alloy.

According to one embodiment, the compound wettable by titanium is titanium carbide.

According to another embodiment, the compound wettable by titanium is titanium diboride.

According to a particular embodiment, the fibre is coated with titanium carbide by reactive chemical vapour deposition.

Preferably in this case, the reactive chemical vapour deposition is applied using a titanium tetrachloride precursor in a hydrogen carrier gas.

According to one embodiment, for the formation of a titanium carbide coating between 50 and 300 nm thick, preferably about 100 nm thick, the deposition is carried out with the following parameters:

the fibre temperature is between 1080 K and 1650 K, preferably between 1480 K and 1530 K;
the ratio of the hydrogen concentration to the titanium tetrachloride concentration is between 14.2 and 59.6 and the fibre run speed is between 1 m/min and 3 m/min.

According to an embodiment, the method comprises an additional step of coating with a second wetting compound before coating of the fibre by the metal.

Advantageously in this case, the second compound is tin.

Figure 2:
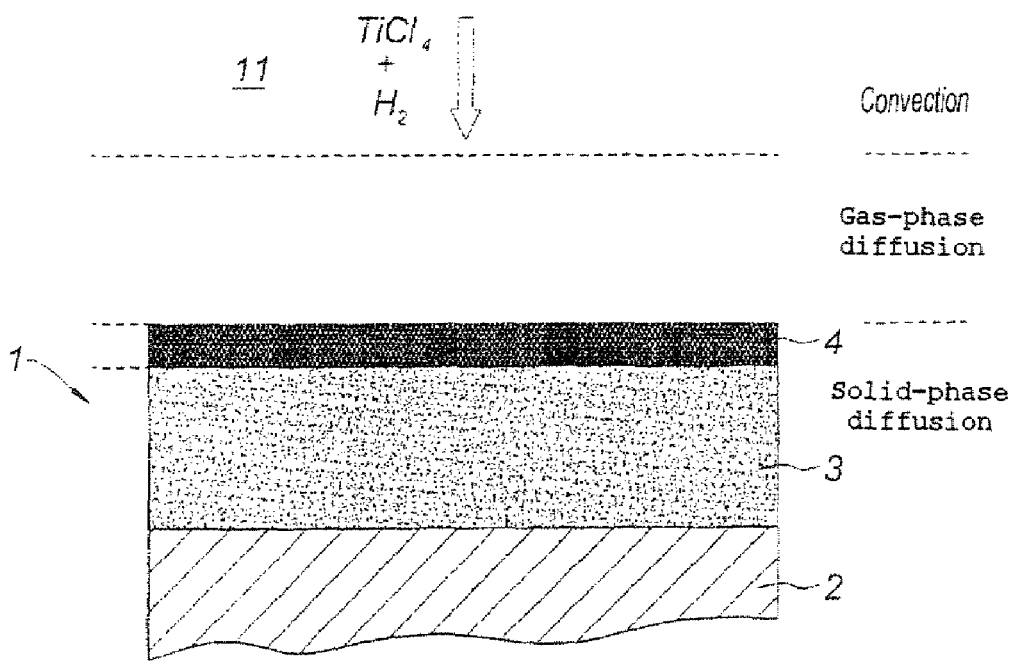

The invention will be better understood from the following description of the preferred embodiment of the inventive method, with reference to the plates appended hereto, in which:

FIG. 1 shows a schematic view of the device for coating the fibre by a compound wettable by the metal and FIG. 2 shows a partial schematic cross section of a portion of the surface of a fibre coated with a wettable compound.

The invention is described with regard to the formation of a coated wire comprising a silicon carbide ceramic fibre coated with a sheath of a titanium alloy. With reference to FIG. 2, the ceramic fibre 1 comprises a silicon carbide layer 2, forming the body of the fibre, about 100 to 150 μm in diameter, formed by chemical vapour deposition of silicon carbide on a carbon core about 35 to 40 μm in diameter. The fibre is covered with an outer coating 3 of carbon or pyrocarbon, about 3 μm thick. This outer coating has the function of protecting the silicon carbide fibre against chemical attack and against the propagation of microdefects; hence this coating serves as a diffusion barrier between the ceramic fibre and the metal alloy, which is chemically highly reactive, and also provides protection against the propagation of defects.

This fibre 1 is coated with a compound 4 wettable by the titanium alloy with which the fibre 1 is coated to form the coated wire. For this purpose, a coating device 5 is used, shown in FIG. 1, and described below.

This compound 4 is chosen according to the physicochemical, mechanical and technological requirements to which a person skilled in the art is subjected for this coating, intended to be placed in contact with the liquid titanium alloy, at high temperature, which will form the metal sheath of the coated wire, coating the ceramic fibre. Some of the requirements are in particular:

capability of wetting by titanium;
preservation of the mechanical properties of the ceramic fibre and
low-cost continuous application.

To meet these requirements, and within the context of the formation of a coated wire as described here, a titanium carbide coating is formed; the thickness of this coating may, for example, be 100 nanometres. This compound is the major component of the interphase between the fibre and the metal, which is formed in the context of a method for titanium coating of a ceramic fibre with a carbon coating of the prior art. In fact, in such a method, when the fibre passes through the titanium bath, the latter combines with the carbon located at the fibre surface to form a titanium carbide phase, at the interface between the carbon layer and the titanium layer. It is the rate of formation of this phase that is limiting as to the wettability of the fibre. The fibre is not sufficiently wettable by the titanium alloy if, with regard to its run speed through the metal bath, the titanium carbide does not have sufficient time to form, because of a limitation in carbon transfer into the metal. By providing for a titanium carbide coating, this mechanism is to some extent anticipated, thereby allowing easier coating of the fibre by the titanium alloy, because titanium carbide is highly wettable by titanium. More precisely, instead of a carbon/liquid titanium interaction, a titanium carbide/liquid titanium interaction occurs during the coating in the liquid titanium bath, for which chemical equilibria exist, whereas carbon cannot be in equilibrium with titanium. Again, titanium carbide is the compound that enables the carbon to be coated by the titanium, the latter only wetting the carbon thanks to the formation of titanium carbide.

Thus, thanks to the coating of the fibre by a wetting compound 4, which is titanium carbide here, the subsequent coating of the fibre by titanium is promoted, thereby allowing high-speed production, the titanium carbide coated fibre being highly wettable by titanium.

The method selected here is a method for coating the fibre by titanium carbide by Reactive Chemical Vapour Deposition (RCVD). Such an RCVD deposition consists in depositing a phase on a substrate by chemical reaction between a gaseous precursor and the solid substrate, carbon here, maintained at high temperature. Contrary to conventional chemical vapour deposition, one of the elements necessary for forming the deposit is contained in the substrate, hence the term "reactive" for this deposition. The vapour phase consists of a titanium precursor, titanium tetrachloride $TiCl_4$ here, and a carrier gas, hydrogen here.

With reference to FIG. 2, when the precursor approaches near the heated fibre 1, it decomposes and the titanium adsorbed on the surface reacts with the carbon to form titanium carbide 4. As this titanium carbide layer 4 is formed, the carbon must diffuse through this layer in order to contact the titanium-rich gas phase, so that the rate of formation of this layer decreases with time.

The gas phase 11 is conveyed close to the fibre 1 by convection, a gas phase diffusion zone forming near the surface of the fibre 1. At this surface, the solid carbon phase diffuses to form titanium carbide.

The overall equation of the reaction is:

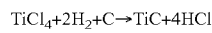

$$TiCl_4 + 2H_2 + C \rightarrow TiC + 4HCl$$

The rate of deposition by such a method is high ($10^3$ to $10^4$ Å/min). Moreover, the thickness, stoichiometry, morphology and crystal structure of the deposit can be controlled easily. The deposit has high purity, is very uniform and adheres well to the substrate. Furthermore, its dynamic character allows its incorporation in an industrial production line.

The coating device 5 shown in FIG. 1 will now be described.

This device 5 comprises a first, pay-out reel 6, coupled with a mechanical brake to maintain a constant tension in the fibre 1, and a second, take-up reel 7. The fibre 1 is made to run between the pay-out reel 6 and the take-up reel 7. During this travel, from the pay-out reel 6 to the take-up reel 7, the fibre 1 passes successively through three cells: a first cell 8 for cleaning the fibre, a second cell 9 for coating will the wettable compound, and a third cell 10 for cooling.

Each cell 8, 9, 10 comprises a gas inlet 8', 9', 10', respectively, and a gas outlet 8'', 9''', 10'', respectively, which is necessary for the operation of the cell 8, 9, 10.

The cleaning cell 8 is fed with a gas mixture of hydrogen $H_2$ and argon Ar. The outer surface of the fibre 1, that is the outer surface of the pyrocarbon coating 3, which runs through the cell 8, is purified by this gas mixture. The hydrogen and argon flow rates are controlled by rotameters.

The coating cell 9, which forms the deposition reactor, is fed with the gas phase, comprising the precursor and the carrier gas, by a bubbler 12. The bubbler 12 comprises a chamber 13 containing a liquid mixture of titanium tetrachloride $TiCl_4$, which forms the precursor, in which a tube 14 fed with hydrogen gas $H_2$, forming the carrier gas, is immersed, enabling the formation of the gas phase introduced into the coating cell 9. A tube 14 emerges from the chamber 13 with the titanium tetrachloride and hydrogen gas phase, which is conveyed to the coating cell 9. The bubbler 12 is maintained at a controlled temperature, using resistors 15 immersed in a bath in which the chamber 13 containing the precursor is immersed. The precursor concentration in the gas phase depends directly on the hydrogen flow rate in the bubbler and the temperature setpoint thereof. With regard to the low hydrogen flow rates used here, the titanium tetrachloride partial pressure in the bubbler is considered to be equal to the saturation vapour pressure at the temperature setpoint. By way of example, the ratio $R=[H_2]/[TiCl_4]$ is equal to 59.6 and 14.2 at 25° C. and 60° C., respectively.

To facilitate the cleaning of the fibre 1 and to obtain a good titanium carbide deposit, the fibre 1 is heated by Joule effect in the first two cells, the cleaning 8 and coating 9 cells. For this purpose, electrodes 16, 17, 18 are provided at the ends of the cells 8, 9, containing a mixture of mercury Hg and indium In and supplied with electric power. The temperature of the fibre 1 is, for example, measured by an optical pyrometer.

The third cell 10 comprises a reducing atmosphere of hydrogen $H_2$, for cooling the filament and for largely avoiding the oxidation of the titanium carbide leaving the coating cell 9.

Four parameters have a particularly strong influence on the physicochemical and morphological properties of the titanium carbide deposit. These are: the temperature T of the fibre 1, particularly of the substrate in the coating cell 9, that is, of its outer surface; the ratio $R=[H_2]/[TiCl_4]$ discussed above; the height H of the coating cell 9; and the run speed V of the fibre 1 through the coating device 15. To obtain a good quality deposit, and by way of example, the following parameter ranges have been selected, for a coating cell 300 mm high and for the formation of a titanium carbide coating between 50 and 300 nm thick, preferably about 100 nm thick, for a deposition time of between 6 and 18 seconds:

T between 1080 K and 1650 K, preferably between 1480 K and 1530 K;

R between 14.2 and 59.6;

H between 50 and 500 mm; and

V between 1 m/min and 3 m/min.

Incidentally, the thickness of the deposit depends more on the ratio R than on the total gas phase flow rate, hence the use of a low hydrogen flow rate (about 150 cm$^3$/min here).

This produces a titanium carbide coating having slight variations in surface roughness, thereby favouring its wettability by titanium and hence the possibility of coating the fibre by titanium at high speeds, because the time required for the wetting is short.

The fibre 1 with its coating of a compound 4 wettable by titanium can then be coated with titanium, to form a coated wire necessary for preparing a metal matrix composite. The coated fibre 1 is thus conveyed into a liquid titanium alloy feed, preferably according to the method described in Patent EP 0 931 846. Because of its coating by a compound wettable by the matrix material, here titanium carbide wettable by titanium, the fibre 1 instantly penetrates into the liquid metal feed, comprehensively, and is perfectly wet by the titanium, which surrounds it completely. In the coated wire obtained, the fibre 1 is centred with regard to the titanium sheath deposited uniformly on its surface. Due to the high wettability of titanium carbide by titanium, the coating of the fibre 1 by titanium is not only achieved with high uniformity, but is also feasible at high fibre run speeds, typically 3 m/sec. In the prior art, this speed was limited by the time of formation of the intermediate phase, titanium carbide in this case. A thick uniform metal sheath can thus be obtained, notwithstanding the high melting point and high reactivity of the metal, here a titanium alloy, with the fibre. The fibre 1 is also protected by the coating of wettable compound 4 against chemical attack. The method can be implemented at low cost and on an industrial scale.

The method can be further improved by an additional coating by a compound that is easily wettable by the metal, thereby supplementing the effect of the first coating of wettable compound. In the particular case described here with regard to a titanium carbide coating, it is possible, for example, to add a tin coating. This coating can be obtained simply by liquid deposition.

The inventive method has been described with regard to a reactive chemical vapour deposition RCVD, but it goes without saying that any other type of deposition can be considered, particularly standard chemical vapour deposition.

Moreover, and according to another embodiment, the compound wettable by titanium with which the fibre 1 is coated is titanium diboride $TiB_2$.

The invention claimed is:

1. A method for metallic coating of fibers by liquid technique, comprising:
   coating the fiber with a barrier-forming material that creates a diffusion barrier with the metal;
   coating the barrier-forming material with a first compound that is wettable by the metal;
   coating the first compound with a second compound that is wettable by the metal, the second compound is tin; and
   coating the second compound with the metal through a liquid metal bath,
   wherein the metal is a titanium alloy.

2. The method according to claim 1, wherein the fiber is a ceramic fiber.

3. The method according to claim 2, wherein the fiber is a silicon carbide fiber, and the barrier-forming material is pyrocarbon or carbon.

4. The method according to claim 3, wherein the first compound wettable by the metal is titanium carbide.

5. The method according to claim 4, wherein the barrier-forming material is coated with titanium carbide by reactive chemical vapor deposition.

6. The method according to claim 5, wherein the reactive chemical vapor deposition is applied using a titanium tetrachloride precursor in a hydrogen carrier gas.

7. The method according to claim 6, wherein for the formation of a titanium carbide coating between 50 and 300 nm thick, the deposition is carried out with the following parameters:
   the fiber temperature is between 1080 K and 1650 K;
   the ratio of the hydrogen concentration to the titanium tetrachloride concentration is between 14.2 and 59.6 and the fiber run speed is between 1 m/min and 3 m/min.

8. The method according to claim 3, wherein the first compound wettable by the metal is titanium diboride.

9. The method according to claim 1, wherein the first compound is coated by the second compound by liquid deposition.

10. The method according to claim 1, wherein the metal coated fiber comprises four distinct layers.

11. A method for metallic coating of fibers by liquid technique, comprising:
   coating the fiber with a barrier-forming material that creates a diffusion barrier with the metal, the barrier-forming material, the barrier-forming material selected from a group consisting of carbon and pyrocarbon;
   coating the barrier-forming material with a first compound that is wettable by the metal, the first compound selected from a group consisting of titanium carbide and titanium diboride;
   coating the first compound with a second compound that is wettable by the metal, the second compound is tin; and
   coating the second compound with the metal through a liquid metal bath,
   wherein the metal is a titanium alloy.

* * * * *